(12) United States Patent
Lee

(10) Patent No.: US 9,521,310 B2
(45) Date of Patent: *Dec. 13, 2016

(54) METHOD AND APPARATUS FOR FOCUSING ON SUBJECT IN DIGITAL IMAGE PROCESSING DEVICE

(71) Applicant: SAMSUNG ELECTRONICS CO., LTD., Suwon-si, Gyeonggi-do (KR)

(72) Inventor: Jae-myung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,372

(22) Filed: Dec. 24, 2014

(65) Prior Publication Data

US 2015/0109517 A1 Apr. 23, 2015

Related U.S. Application Data

(63) Continuation of application No. 12/911,821, filed on Oct. 26, 2010, now Pat. No. 8,922,705.

(30) Foreign Application Priority Data

Nov. 17, 2009 (KR) .................. 10-2009-0110913

(51) Int. Cl.
*H04N 5/232* (2006.01)

(52) U.S. Cl.
CPC ...... *H04N 5/23212* (2013.01); *H04N 5/23219* (2013.01)

(58) Field of Classification Search
CPC .................. H04N 5/23212; H04N 5/23219

USPC .................. 348/208.14, 222.1, 345, 349
See application file for complete search history.

(56) References Cited

U.S. PATENT DOCUMENTS

| 8,106,999 B2* | 1/2012 | Izawa | G02B 7/36 348/333.02 |
|---|---|---|---|
| 8,195,042 B2 | 6/2012 | Kimoto | |
| 2003/0071908 A1* | 4/2003 | Sannoh et al. | 348/345 |
| 2008/0260375 A1* | 10/2008 | Yumiki | 396/263 |
| 2008/0284901 A1 | 11/2008 | Misawa | |
| 2009/0095880 A1 | 4/2009 | Otsuki | |
| 2010/0002127 A1 | 1/2010 | Ishii | |
| 2010/0322611 A1 | 12/2010 | Yoshida et al. | |

FOREIGN PATENT DOCUMENTS

| JP | 2001-215403 A | 8/2001 |
|---|---|---|
| JP | 2002-162559 A | 6/2002 |
| JP | 2007-067934 A | 3/2007 |

(Continued)

OTHER PUBLICATIONS

Office Action issued for related application KR 10-2009-0110913, Aug. 19, 2015, 14 pages.

(Continued)

*Primary Examiner* — Gevell Selby
(74) *Attorney, Agent, or Firm* — Drinker Biddle & Reath LLP

(57) ABSTRACT

An method and apparatus focus on a subject in a digital image processing device, the apparatus including a digital signal processor (DSP) for focusing on a subject based on an eye detected from a face of a subject having a greater ratio than a predetermined ratio in a picture.

9 Claims, 11 Drawing Sheets

(56) References Cited

FOREIGN PATENT DOCUMENTS

| JP | 2007-258909 A | 10/2007 |
| JP | 2008-129082 A | 6/2008 |
| JP | 2008-281733 A | 11/2008 |
| KR | 10-2009-0038828 A | 4/2009 |

OTHER PUBLICATIONS

Notice of Allowance issued for related application KR 10-2009-0110913, Nov. 19, 2015, 4 pages.

* cited by examiner

FIG. 6A
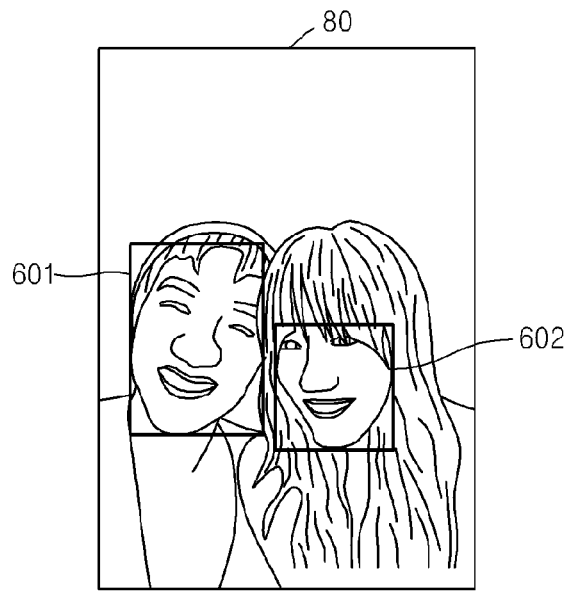
FIG. 6B
FIG. 6C
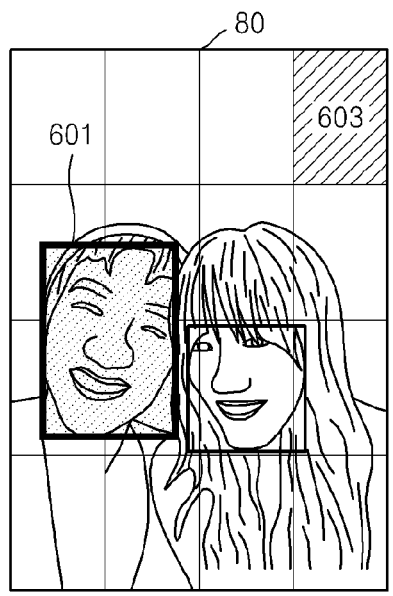
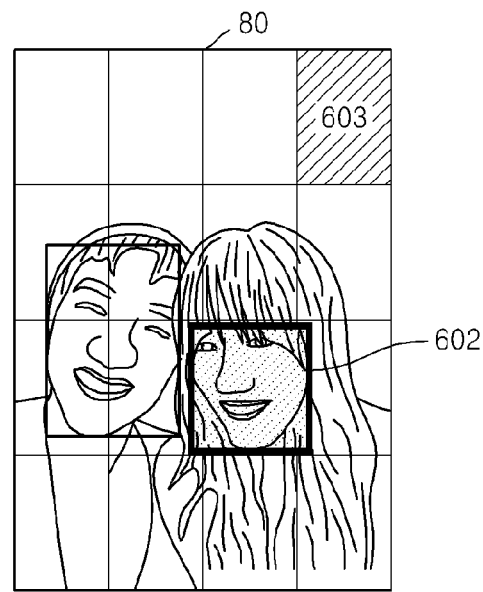

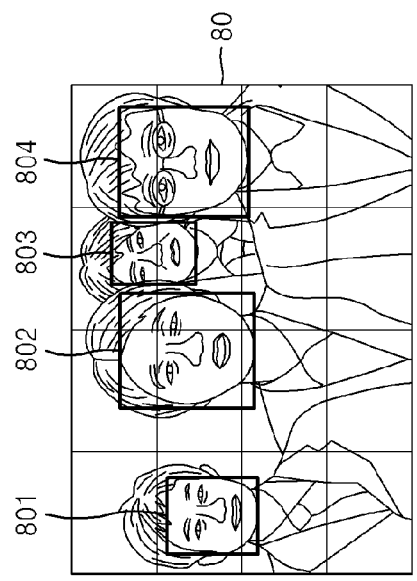
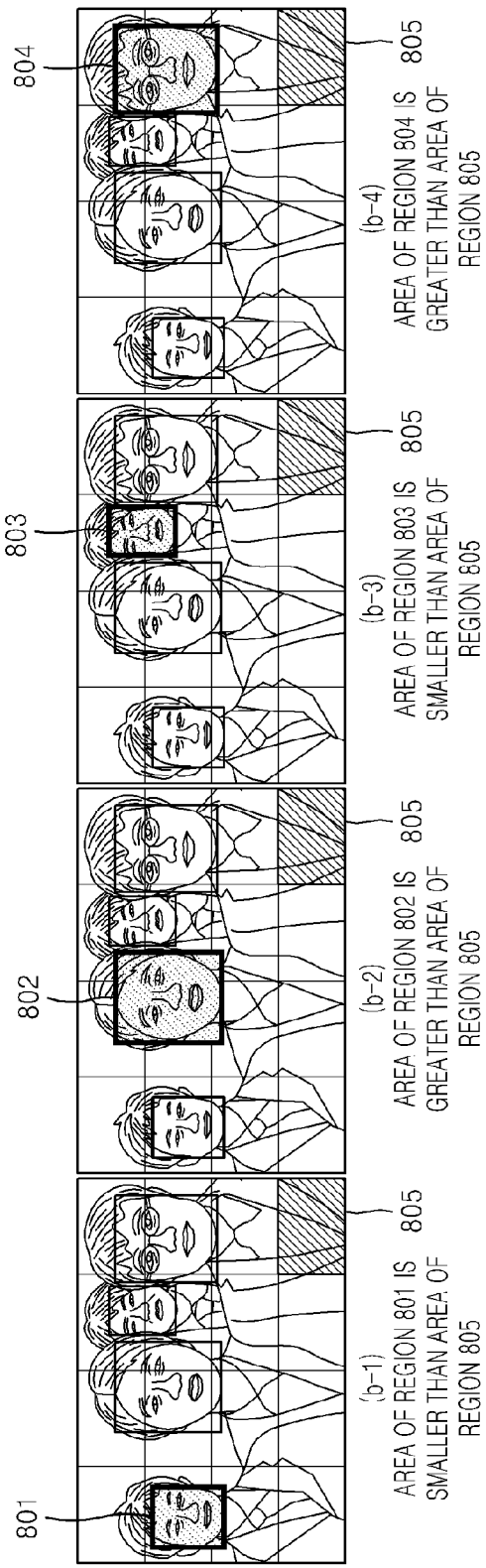

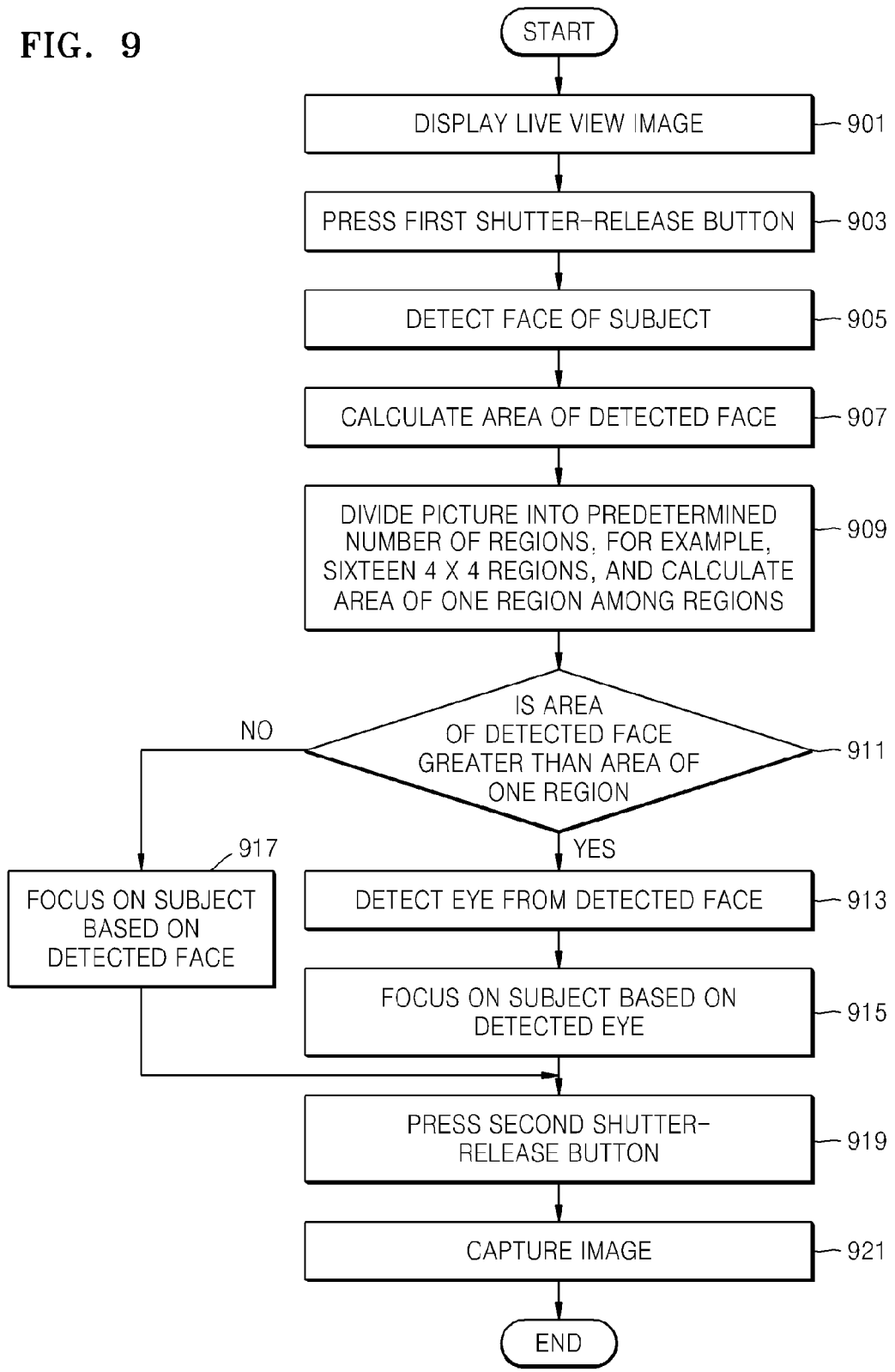

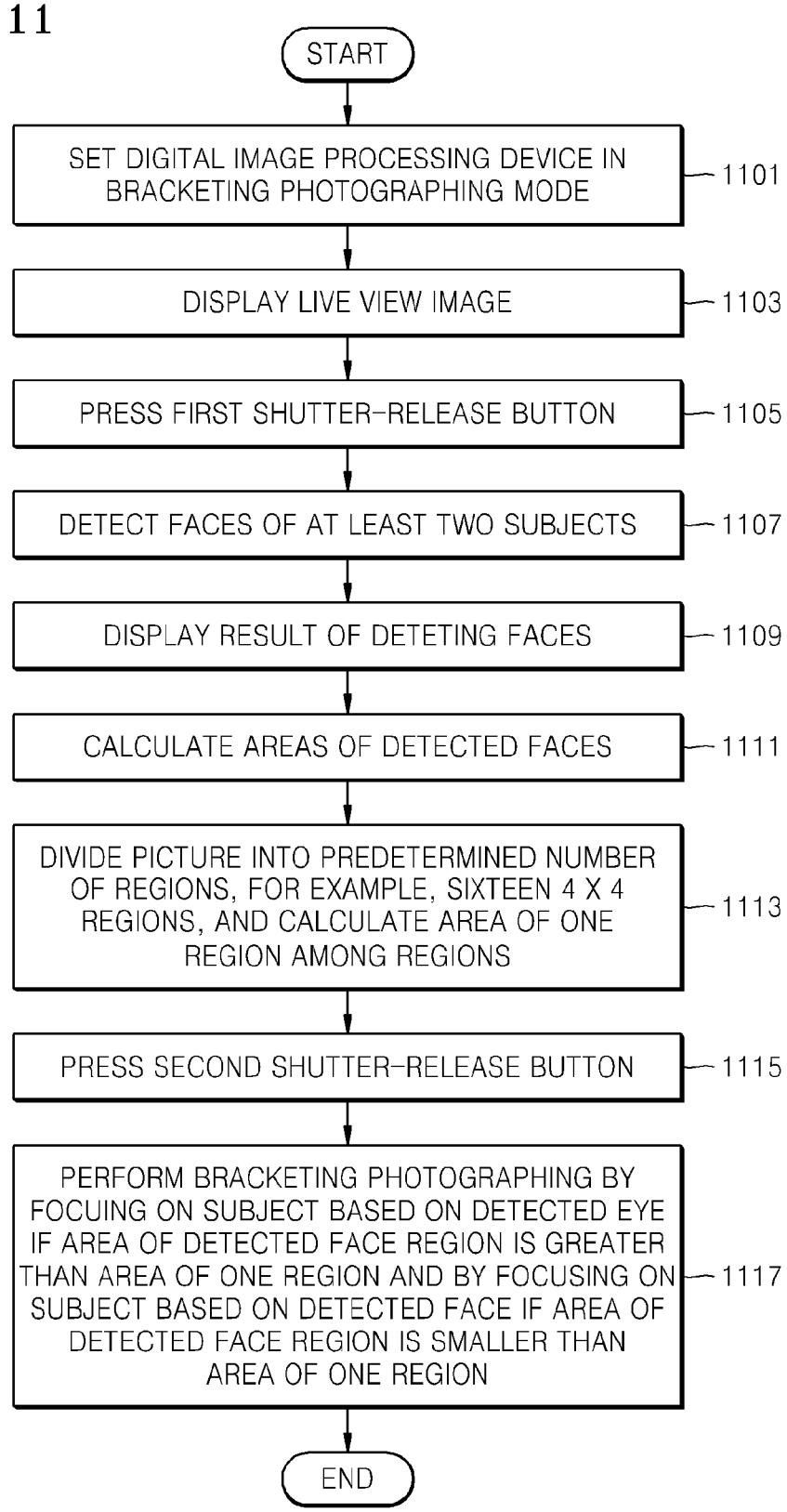

METHOD AND APPARATUS FOR FOCUSING ON SUBJECT IN DIGITAL IMAGE PROCESSING DEVICE

CROSS-REFERENCE TO RELATED PATENT APPLICATION APPLICATIONS

This application is a continuation of U.S. patent application Ser. No. 12/911,821, filed Oct. 26, 2010, which claims the benefit of Korean Patent Application No. 10-2009-0110913, filed on Nov. 17, 2009, in the Korean Intellectual Property Office, the disclosures of which are incorporated herein in their entirety by reference.

BACKGROUND

The invention relates to a method and apparatus for focusing on a subject based on the eyes detected from faces in a digital image processing device.

Generally, when an image is captured, a user focuses on a subject to be photographed by using a half shutter and performs photographing by adjusting a composition of the image. When photographing is performed by setting a digital image processing device in a portrait mode, the digital image processing device allows a face of a subject to be automatically recognized and the face to be focused on.

However, when photographing is performed by opening an iris diaphragm, once the eyes are focused on and the composition of the image is changed, a focusing distance may be slightly varied. Thus, the eyes may not be properly focused on, and other portions may be focused on. Thus, it is difficult to obtain a clear image.

SUMMARY

Various embodiments of the invention provide a method and apparatus for focusing on a subject by which photographing is performed by focusing on the subject based on the eyes detected from faces having a greater ratio than a predetermined ratio in a picture, in a digital image processing device.

According to an embodiment, there is provided an apparatus for focusing on a subject, the apparatus including a digital signal processor (DSP) for focusing on the subject based on an eye detected from a face of the subject having a greater ratio than a predetermined ratio in a picture.

According to another embodiment, there is provided an apparatus for focusing on a subject, the apparatus including a digital signal processor (DSP) for focusing on a subject based on an eye detected from one face selected from at least two faces of at least two subjects, each having a greater ratio than a predetermined ratio in a picture.

According to another embodiment, there is provided an apparatus for focusing on a subject, the apparatus including a digital signal processor (DSP) for focusing on a subject based on an eye detected from faces of at least two subjects each having a greater ratio than a predetermined ratio in a picture and for performing bracketing photographing.

According to another embodiment, there is provided a method of focusing on a subject, the method including the operations of detecting a face of the subject; calculating a ratio of the detected face in a picture; if a ratio of the subject in the picture is greater than a predetermined ratio, detecting an eye from the detected face; and focusing on the subject based on the detected eye and performing photographing.

According to another embodiment, there is provided a method of focusing on a subject, the method including the operations of detecting a face from at least two subjects; calculating a ratio of a face of a selected face region in the picture; if a ratio of the face of the selected face region in the picture is greater than a predetermined ratio, detecting an eye from the selected face region; and focusing on the subject based on the detected eye and performing photographing.

According to another embodiment, there is provided a method of focusing on a subject, the method including the operations of detecting faces from at least two subjects; if an image capturing signal is received, calculating ratios of the detected faces in the picture; and focusing on the subject based on the eye detected from the faces, each having a greater ratio than a predetermined ratio in a picture and performing bracketing photographing.

BRIEF DESCRIPTION OF THE DRAWINGS

The above and other features and advantages of the invention will become more apparent by describing in detail exemplary embodiments thereof with reference to the attached drawings in which:

FIGS. 6A through 6C are pictorial images that illustrate face detection and focusing according to the DSP of FIG. 5;

FIGS. 8A and 8B are pictorial images that illustrate face detection and focusing according to the DSP of FIG. 7;

FIG. 9 is a flowchart illustrating a method of focusing on a subject in the digital image processing device of FIG. 1, according to an embodiment of the invention;

FIG. 11 is a flowchart illustrating a method of focusing on a subject in the digital image processing device of FIG. 1, according to another embodiment of the invention.

DETAILED DESCRIPTION

Hereinafter, the invention will be described in detail by explaining exemplary embodiments of the invention with reference to the attached drawings.

Figure 1:
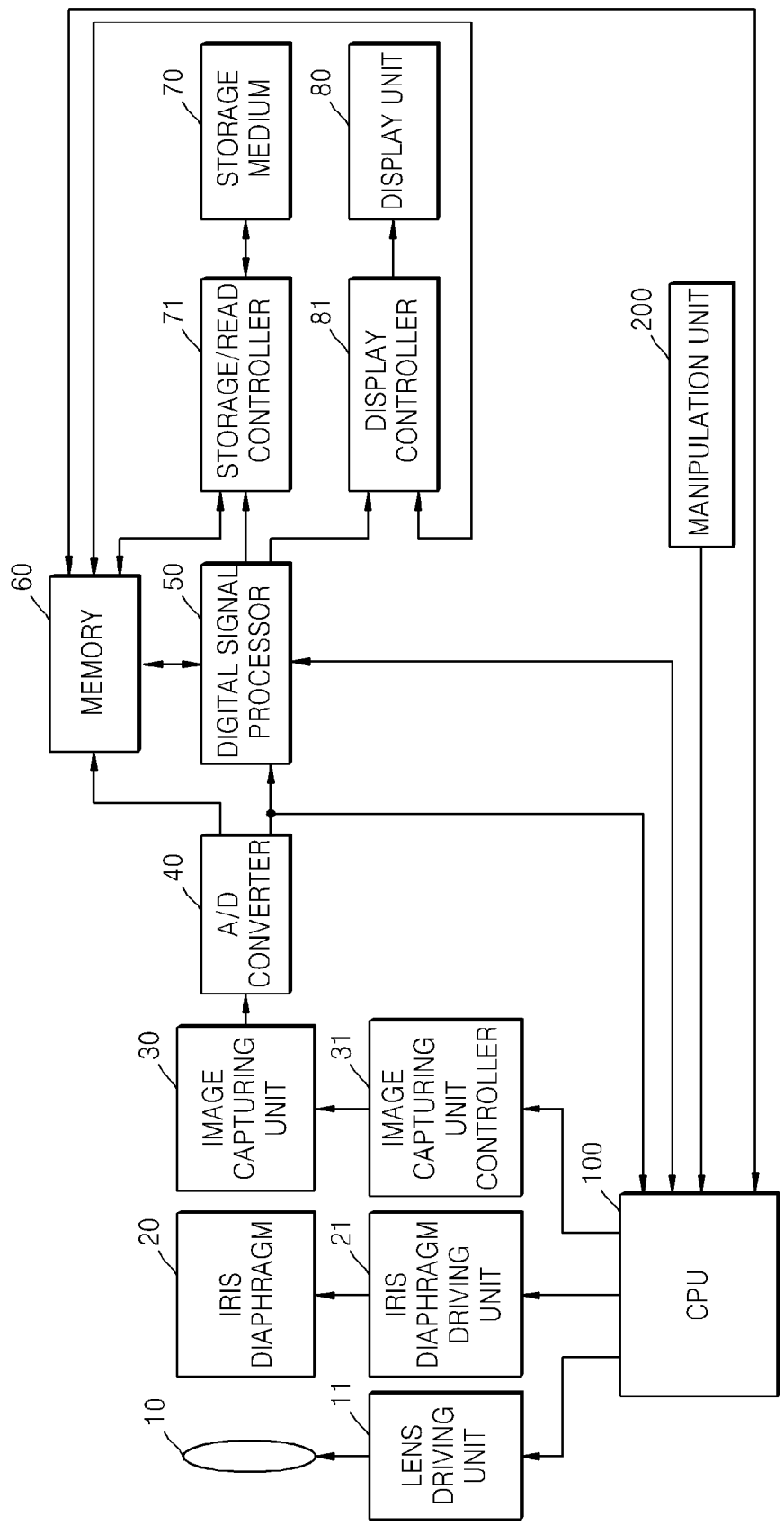
FIG. 1 is a block diagram of an apparatus for focusing on a subject in a digital image processing device, according to an embodiment of the invention.

FIG. 1 is a block diagram of an apparatus for focusing on a subject in a digital image processing device, according to an embodiment of the invention. In particular, FIG. 1 schematically illustrates the digital image processing device that may determine faces. However, the invention is not limited to the digital image processing device shown in FIG. 1, and the invention may be applied to any of various image processing devices such as personal digital assistants (PDAs), personal multimedia players (PMPs), etc. the like.

The following embodiments and modifications thereof are also not limited to the digital image processing device shown in FIG. 1.

Overall operation of the digital image processing device of FIG. 1 is controlled by a central processing unit (CPU) 100. The digital image processing apparatus of FIG. 1 includes a manipulation unit 200 that includes keys for generating an electrical signal according to user manipulation. The electrical signal generated by the manipulation unit 200 is transmitted to the CPU 100 so that the CPU 100 may control the digital image processing device of FIG. 1 according to the electrical signal.

In a photographing mode, as the electrical signal generated by user manipulation is applied to the CPU 100, the CPU 100 may control a lens driving unit 11, an iris diaphragm driving unit 21, and an image capturing unit controller 31 according to the electrical signal. As such, the position of a lens 10, degree of opening of an iris diaphragm 20, and sensitivity of an image capturing unit 30 are controlled. The image capturing unit 30 generates analog data from input light, and an analog/digital (A/D) converter 40 converts the analog data output by the image capturing unit 30 into digital data. The A/D converter 40 may not be needed according to characteristics of the image capturing unit 30.

The digital data generated by the A/D converter 40 may be input to a digital signal processor (DSP) 50 via a memory 60 or may be directly input to the DSP 50. If necessary, the data may be input to the CPU 100. Here, the memory 60 may be a read only memory (ROM) or a random access memory (RAM).

The DSP 50 may perform digital signal processing such as Gamma correction and white balance adjusting, if necessary.

Figure 2:
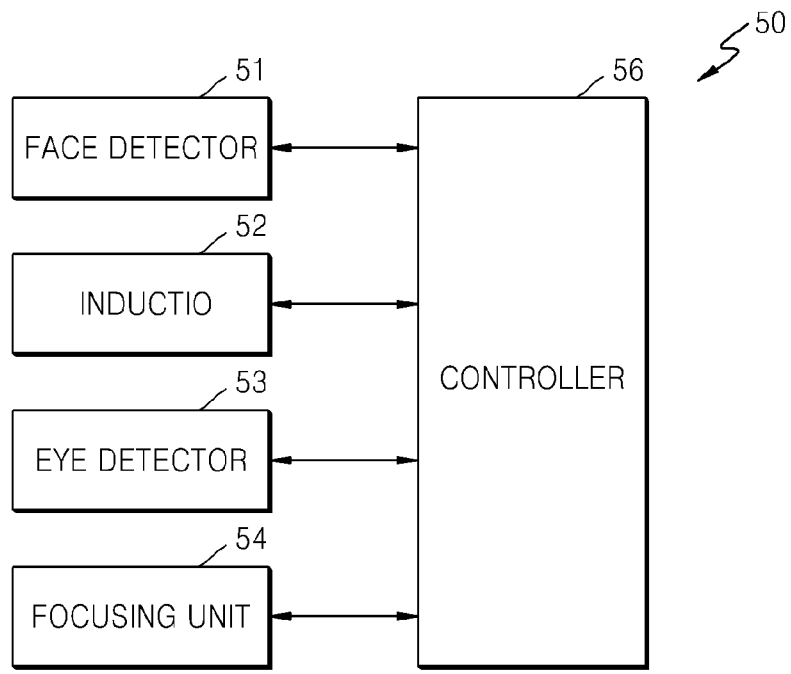
FIG. 2 is a detailed block diagram of a digital signal processor (DSP) of the digital image processing device shown in FIG. 1, according to an embodiment of the invention.
Figure 5:
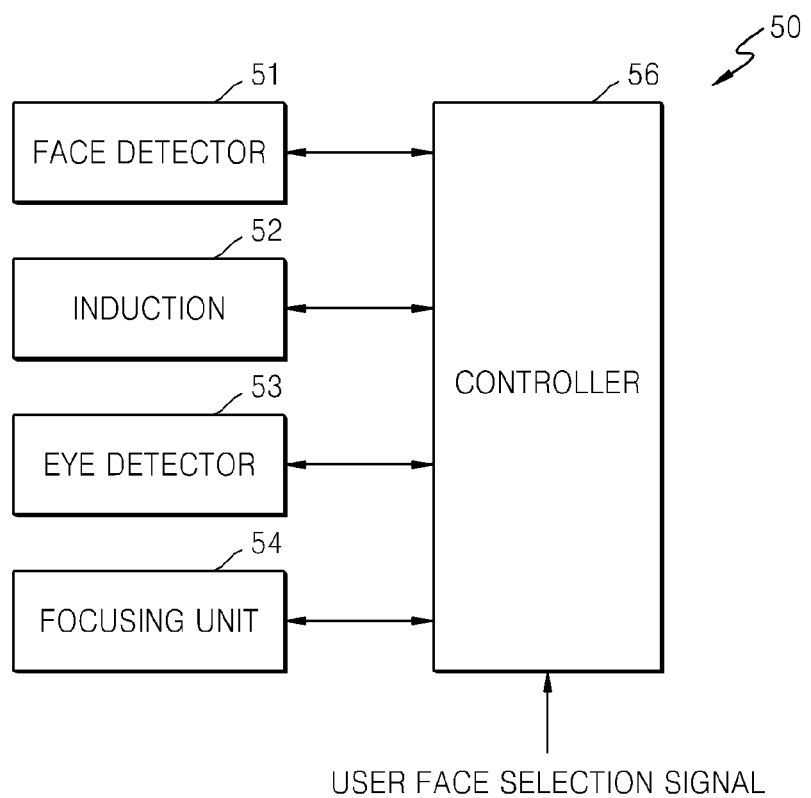
FIG. 5 is a detailed block diagram of the DSP of FIG. 2, according to another embodiment of the invention.
Figure 7:
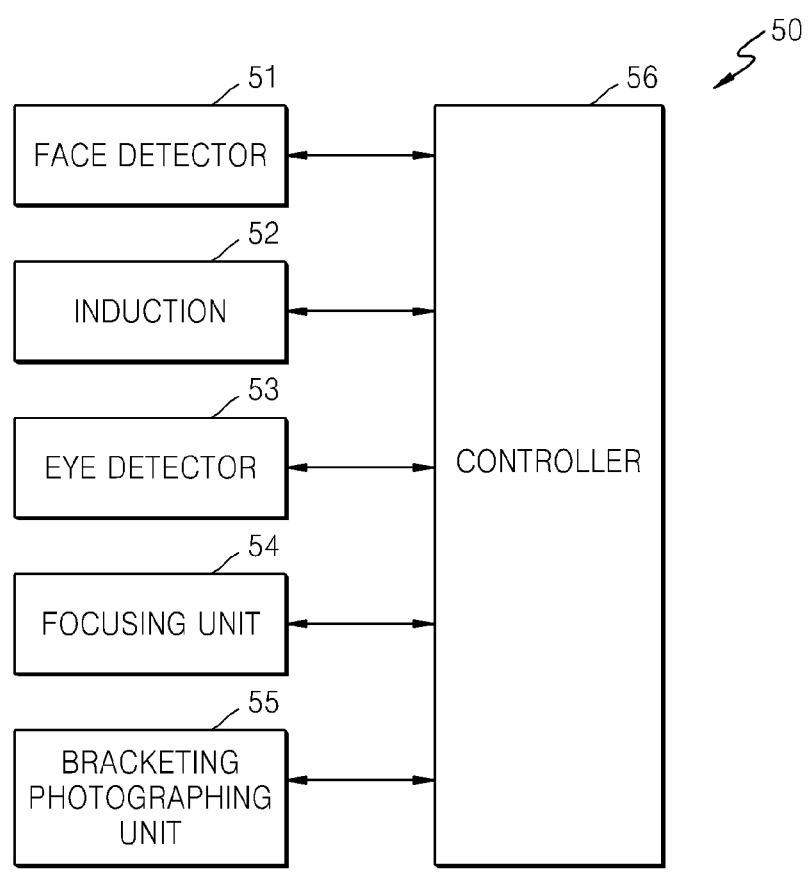
FIG. 7 is a detailed block diagram of the DSP of FIG. 2, according to another embodiment of the invention.

FIGS. 2, 5, and 7 are detailed block diagrams of digital signal processor (DSP)s of the digital image processing device shown in FIG. 1, according to embodiments of the invention.

Referring to FIGS. 2, 5, and 7, the DSP 50 includes a face detector 51, a ratio calculating unit 52, an eye detector 53, a focusing unit 54, a bracketing photographing unit 55, and a controller 56. The face detector 51, the ratio calculating unit 52, the eye detector 53, the focusing unit 54, the bracketing photographing unit 55, and the controller 56 may instead be additional elements disposed outside the DSP 50. Operations of the face detector 51, the ratio calculating unit 52, the eye detector 53, the focusing unit 54, the bracketing photographing unit 55, and the controller 56 will be described later.

An image corresponding to data output from the DSP 50 may be transmitted to a display controller 81 via the memory 60 or may be transmitted directly to the display controller 81. The display controller 81 may control a display unit 80 to display the image. The display unit 80 may be a touch screen. The data output from the DSP 50 may be input to a storage/read controller 71 via the memory 60 or may be input directly to the storage/read controller 71. The storage/read controller 71 may store the data in a storage medium 70 according to an electrical signal input by user manipulation or automatically. The storage/read controller 71 may read data from an image file stored in the storage medium 70, input the read data to the display controller 81 via the memory 60 or via other paths so that the image may be displayed on the display unit 80. The storage medium 70 may be attachable to or detachable from the digital image processing device of FIG. 1 or may be permanently installed in the digital image processing device of FIG. 1.

An operation of the DSP 50 will now be described with reference to FIGS. 2 through 8.

Figure 3:
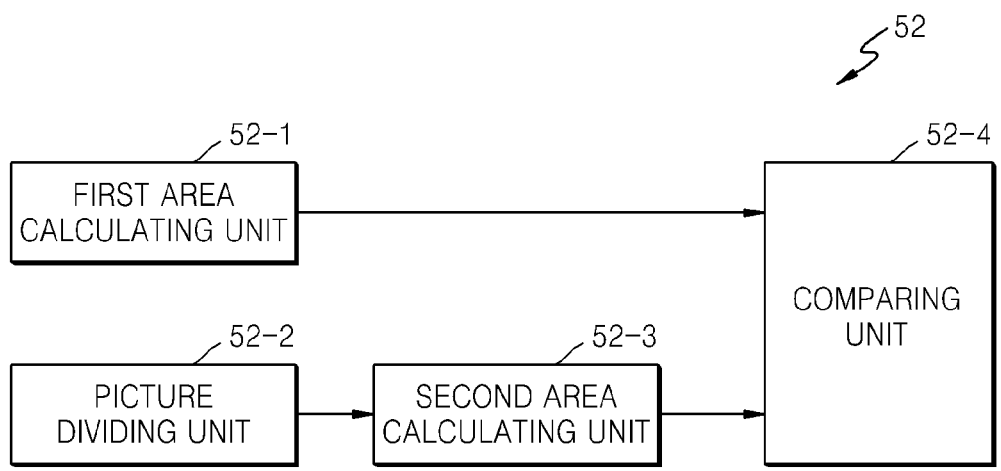
FIG. 3 is a detailed block diagram of a ratio calculating unit of the DSP of FIG. 2, according to an embodiment of the invention.
Figure 4A:
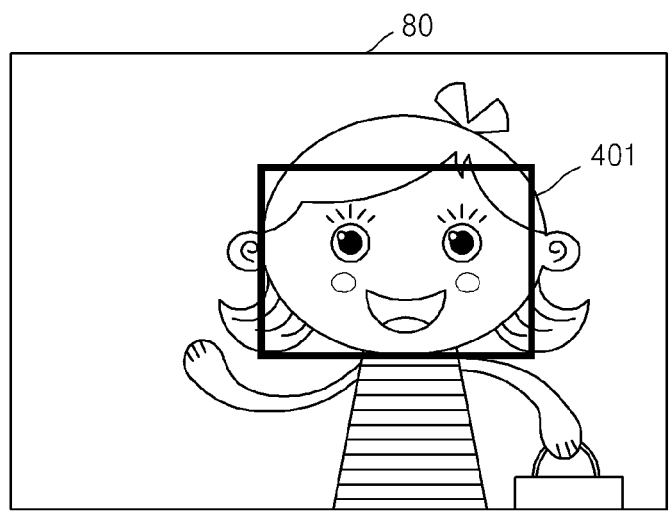
FIGS. 4A and 4B are pictorial images that illustrate face detection and focusing according to the DSP of FIG. 2.
Figure 4B:
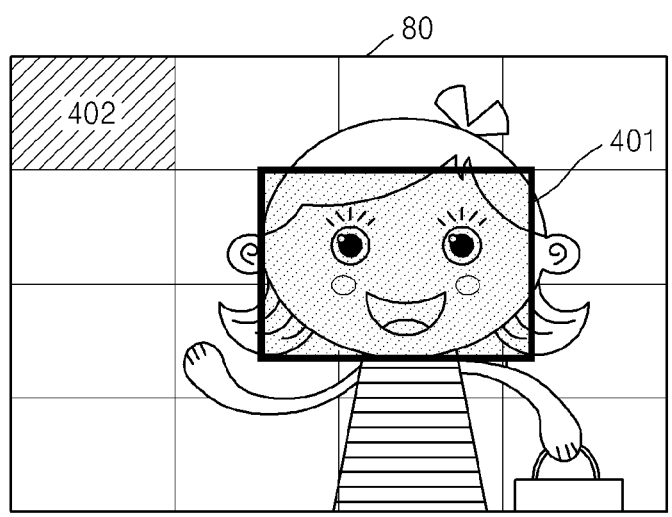

First, an operation of the DSP 50, according to an embodiment of the invention, will be described with reference to FIGS. 2 through 4. FIG. 3 is a detailed block diagram of the ratio calculating unit 52 of the DSP 50 of FIG. 2, according to an embodiment of the invention, and FIGS. 4A and 4B illustrate face detection and focusing according to the DSP 50 of FIG. 2.

The DSP 50 of FIG. 2 focuses on a subject based on the eyes detected from a face of the subject having a greater ratio than a predetermined ratio in the entire picture and includes the face detector 51, the ratio calculating unit 52, the eye detector 53, the focusing unit 54, and the controller 56.

The face detector 51 may detect a face from a live view image that is displayed on the display unit 80 and resized by the controller 56. The face detector 51 finds unchanging features of the face (the eyes, nose, mouth, or contour of a face, skin texture, and skin color) by using feature-based face detection and calculates feature-point coordinates of the face. In particular, skin color, compared to other features of a face, is less sensitive to movement, rotation, and change of the size of the face and thus is generally used to detect a face. In addition, the face detector 51 may form several standard patterns of faces and then store the standard patterns for use in face template-based detection. To perform face template-based detection, the standard patterns are compared with regions of an image so that a face may be detected. In this case, support vector machine (SVM)-based face detection, which is recently widely being used, may be used. SVM-based face detection is a method by which different regions of an image are sampled, the sampled regions are studied with respect to face portions and non-face portions (portions other than a face) by using a studying device and then a face may be found in an input image. Detecting of face information that may be performed by the face detector 51 is well known, and thus a detailed description thereof will not be provided here. FIG. 4A illustrates a result of detecting the face of the subject, and a detected face 401 in the display unit 80.

The ratio calculating unit 52 may calculate a ratio of the detected face 401 in a picture and determines whether the ratio of the detected face 401 in the picture is greater than a predetermined ratio. Thus, when a range where a face is recognized from the picture is large due to close-up photographing, eyes of a subject are focused on, and the subject may be captured more vividly. Also, when the range where the face is recognized from the picture is large due to close-up photographing, cosine errors that may occur in photographing may be reduced.

The ratio calculating unit 52 of FIG. 3 includes a first area calculating unit 52-1, a picture dividing unit 52-2, a second area calculating unit 52-3, and a comparing unit 52-4.

The first area calculating unit 52-1 calculates an area of the detected face 401. The face detector 51 calculates coordinates of the face during face detection and thus a starting point, a width, and a height of the area of the detected face 401 may be known and the area of the detected face 401 may be calculated.

The picture dividing unit 52-2 divides the display unit 80, i.e., the picture, into a predetermined number of regions. As an example thereof, the picture dividing unit 52-2 may divide the picture into nine (3×3) regions or sixteen (4×4) regions. FIG. 4B illustrates an example in which the picture is divided into sixteen (4×4) regions.

The second area calculating unit 52-3 calculates an area of a region that is obtained by dividing the entire picture into the predetermined number of regions. For example, the second area calculating unit 52-3 calculates an area of a region 402 among the sixteen regions, as illustrated in FIG. 4B.

The comparing unit 52-4 compares the area of the detected face 401 with the area of the region 402 and outputs a result of the comparison to the controller 56.

The controller 56 receives the result of the comparison and determines the ratio of the detected face 401 in the picture. When the area of the detected face 401 is greater than the area of the region 402, the controller 56 operates the eye detector 53 and the focusing unit 54, and when the area of the face detection region 401 is smaller than the area of the region 402, the controller 56 operates the focusing unit 54.

When the area of the detected face 401 is greater than the area of the region 402, the eye detector 53 receives an operating command from the controller 56 and detects an eye from the detected face 401. The eye detector 53 detects the eye by using various methods such as by using a feature point of a face or using eye blinking.

When the area of the detected face 401 is greater than the area of the region 402, the focusing unit 54 focuses on the subject based on the detected eye according to an operating command received from the controller 56, and when the area of the face detection region 410 is smaller than the area of the region 402, the focusing unit 54 focuses on the subject based on the detected face 401 according to an operating command received from the controller 56.

The controller 56 enlarges an eye portion of the image that is captured by focusing on the subject based on the eye automatically and displays the eye portion during image reproduction so that a user may check whether the subject is properly focused on. Also, when the subject is not properly focused on and the eye image is unclear, the controller 56 may correct the image to be clear.

Another operation of the DSP 50, according to another embodiment of the invention, will be described with reference to FIGS. 5 and 6. FIG. 5 is a detailed block diagram of the DSP of FIG. 2, according to another embodiment of the invention, and FIGS. 6A through 6C illustrate face detection and focusing according to the DSP of FIG. 5. The DSP 50 of FIG. 5 focuses on a subject based on the eyes detected from a face of the subject having a greater ratio than a predetermined ratio in a picture, and includes the face detector 51, the ratio calculating unit 52, the eye detector 53, the focusing unit 54, and the controller 56. Unlike in FIG. 2, in the present embodiment, the controller 56 receives a face selection signal that is detected according to the user's manipulation and controls the ratio calculating unit 52, the eye detector 53, the focusing unit 54 according to the face selection signal.

The face detector 51 may detect at least two faces from the subjects of a live view image, and a detailed description thereof is provided above and thus will not be provided here. FIG. 6A illustrates a result of detecting two faces of two subjects in two face regions, namely, a first and second region 601 and 602.

When the user arbitrarily selects a face region from among the result of detecting the two faces, the controller 56 receives the face selection signal.

The ratio calculating unit 52 calculates a ratio of the face of the selected face region in the picture and determines whether the ratio of the face of the selected face region in the picture is greater than a predetermined ratio. Thus, when a range where a face is recognized from the picture is large due to close-up photographing, the eyes of the subject are focused on, and the subject may be captured more vividly. Also, when the range where the face is recognized from the picture is large due to close-up photographing, cosine errors that may occur in photographing may be reduced.

The operation of the ratio calculating unit 52 is the same as the ratio calculating unit 52 in FIG. 3. When the first face region 601 is selected, as illustrated in FIG. 6B, the ratio calculating unit 52 compares an area of the first face region 601 with an area of a region 603 that is obtained by dividing the entire picture into a predetermined number of regions, and outputs a result of the comparison to the controller 56. When the second face region 602 is selected, as illustrated in FIG. 6C, the ratio calculating unit 52 compares an area of a second face region 602 with the area of the region 603 and outputs a result of the comparison to the controller 56.

The controller 56 receives the result of the comparison from the ratio calculating unit 52 and determines the ratio of the selected first face region 601 in the picture. When the area of the selected first face region 601 is greater than the area of the region 603, the controller 56 operates the eye detector 53 and the focusing unit 54, and when the area of the selected first face region 601 is smaller than the area of the region 603, the controller 56 operates the focusing unit 54.

When the area of the selected first face region 601 is greater than the area of the region 603, the eye detector 53 detects an eye from the first face region 601 according to an operating command received from the controller 56.

When the area of the selected first face region 601 is greater than the area of the region 603, the focusing unit 54 focuses on the subject based on the eye that is detected according to the operating command received from the controller 56. When the area of the selected first face region 601 is smaller than the area of the region 603, the focusing unit 54 focuses on the subject based on the face that is detected according to the operating command received from the controller 56.

Also, the controller 56 receives a result of the comparison from the ratio calculating unit 52 and determines the ratio of the selected second face region 602 in the picture. When the area of the selected second face region 602 is greater than the area of the region 603, the controller 56 operates the eye detector 53 and the focusing unit 54 to focus on the subject based on the detected eye. When the area of the selected second face region 602 is smaller than the area of the region 603, the controller 56 operates the focusing unit 54 to focus on the subject based on the detected face.

The controller 56 enlarges an eye portion of the image that is captured by focusing on the subject based on the eye automatically and displays the eye portion during image reproduction so that the user may check whether the subject is properly focused. Also, when the subject is not properly focused and the eye image is unclear, the controller 56 may correct the image to be clear.

Another operation of the DSP 50, according to another embodiment of the invention, will be described with reference to FIGS. 7 and 8.

FIG. 7 is a detailed block diagram of the DSP 50 of FIG. 2, according to another embodiment of the invention, and FIGS. 8A and 8B illustrate face detection and focusing according to the DSP 50 of FIG. 7. The DSP 50 of FIG. 7 focuses on a subject based on the eyes detected from at least two faces of the subjects each having a greater ratio than a predetermined ratio in a picture, and includes the face detector 51, the ratio calculating unit 52, the eye detector 53, the focusing unit 54, the bracketing photographing unit 55, and the controller 56. Unlike in FIG. 5, in the present embodiment, the controller 56 performs, on the detected faces, bracketing photographing by which several images are simultaneously captured by pressing a photographing button only once.

The face detector 51 may detect the at least two faces from the subjects of a live view image, and a detailed description thereof is provided above and thus will not be provided here. FIG. 8A illustrates a result of detecting four faces of four subjects in four regions, namely, first through fourth face regions 801, 802, 803, and 804.

After displaying a result of detecting the faces on the display unit 80, i.e., in the picture, and receiving a photographing button signal that is input according to the user's manipulation, the controller 56 operates the bracketing photographing unit 55, and the bracketing photographing unit 55 performs, on the detected faces, bracketing photographing by which four images are captured by pressing the photographing button only once, as illustrated in FIG. 8B.

When performing bracketing photographing, the ratio calculating unit 52 calculates the ratio of the detected faces in the picture, and determines whether the ratio of the detected face in the picture is greater than a predetermined ratio. Thus, when a range where a face is recognized from the picture is large due to close-up photographing, the eyes of the subject are focused on, and the subject may be captured more vividly. Also, when the range where the face is recognized from the picture is large due to close-up photographing, cosine errors that may occur in photographing may be reduced.

The operation of the ratio calculating unit 52 is the same as the ratio calculating unit 52 in FIG. 3. As illustrated in FIGS. 8B (b-1) through (b-4), the ratio calculating unit 52 compares an area of each of the first through fourth face regions 801, 802, 803, and 804 with an area of a region 805 that is obtained by dividing the entire picture into a predetermined number of regions, and outputs a result of the comparison to the controller 56.

The controller 56 receives the result of the comparison from the ratio calculating unit 52. When the area of the first face region 801 is smaller than the area of the region 805, as illustrated in FIG. 8B (b-1), the controller 56 operates only the focusing unit 54 to focus on the subject based on the detected face. Also, when the area of the second face region 802 is greater than the area of the region 805, as illustrated in FIG. 8B (b-2), the controller 56 operates the eye detector 53 and the focusing unit 54 to focus on the subject based on the detected eye. Also, when the area of the third face region 803 is smaller than the area of the region 805, as illustrated in FIG. 8B (b-3), the controller 56 operates only the focusing unit 54 to focus on the subject based on the detected face. Also, when the area of the fourth face region 804 is greater than the area of the region 805, as illustrated in FIG. 8B (b-4), the controller 56 operates the eye detector 53 and the focusing unit 54 to focus on the subject based on the detected eye.

In this way, an image that is focused on based on the first and third face regions 801 and 803 detected by bracketing photographing, and an image that is focused on based on the eyes of the second and fourth face regions 802 and 804 detected by bracketing photographing may be captured by pressing the photographing button only once.

The controller 56 enlarges an eye portion of the image that is captured by bracketing photographing and is focused on based on the detected face and the detected eye automatically and displays the eye portion during image reproduction so that the user may check whether the subject is properly focused on. Also, when the subject is not properly focused on and the eye image is unclear, the controller 56 may correct the image to be clear.

Hereinafter, a method of focusing on a subject in a digital image processing device, according to other embodiments of the invention, will be described with reference to FIGS. 9 through 11. The method of focusing on the subject may be performed in the digital image processing device of FIG. 1. A main algorithm of operations of the method of focusing on the subject in the digital image processing device may be performed inside the DSP 50 with peripheral elements of the digital image processing device of FIG. 1.

First, a method of focusing on a subject in a digital image processing device, according to an embodiment of the invention, will be described with reference to FIG. 9. FIG. 9 is a flowchart illustrating a method of focusing on a subject in the digital image processing device of FIG. 1, according to an embodiment of the invention.

Referring to FIG. 9, if a live view image is displayed on the display unit 80, i.e., in a picture, in Operation 901, the DSP 50 receives a first shutter-release button (not shown) signal that is input according to the user's manipulation in Operation 903.

The DSP 50 that receives the input first shutter-release button detects a face of a subject of the live view image in Operation 905. FIG. 4A illustrates a result of detecting the face of the subject, and the detected face 401.

If the face is detected from the subject, the DSP 50 calculates an area of the detected face 401 in Operation 907. The DSP 50 calculates coordinates of the face during face detection and thus a starting point, a width, and a height of the face detection region 401 may be known and the area of the detected face 401 may be calculated.

Subsequently, the DSP 50 divides the entire picture into a predetermined number of regions and calculates an area of a region 402 among the divided regions in Operation 909. As an example thereof, the DSP 50 may divide the picture into nine (3×3) regions or sixteen (4×4) regions. FIG. 4B illustrates an example in which the picture is divided into sixteen (4×4) regions.

The DSP 50 determines whether the area of the detected face 401 is greater than the area of the region 402 in Operation 911. For example, the DSP 50 determines whether the area of the detected face 401 is greater than the area of the region 402, as illustrated in FIG. 4B.

If it is determined that the area of the detected face 401 is greater than the area of the region 402, the DSP 50 detects an eye from the detected face in Operation 913.

The DSP 50 may detect the eye by using various methods such as by using a feature point of a face or using eye blinking. For example, if it is determined that the area of the detected face 401 is greater than the area of the region 402, the DSP 50 detects an eye from the detected face 401, as illustrated in FIG. 4B.

If the eye is detected, the DSP 50 focuses on the subject based on the detected eye. For example, the DSP 50 focuses on the subject based on the eye detected from the detected face 401, as illustrated in FIG. 4B.

In this way, it is determined that the ratio of the detected face in the picture is greater than a predetermined ratio. Thus, when a range where the detected face is recognized from the picture is large due to close-up photographing, the eyes of a subject are focused on, and the subject may be captured more vividly. Also, when the range where the face is recognized from the picture is large due to close-up photographing, cosine errors that may occur in photographing may be reduced.

Otherwise, if it is determined that the area of the detected face 401 is smaller than the area of the region 402, the DSP 50 focuses on the subject based on the detected face in Operation 917.

After the subject is focused on based on the detected eye or the detected face, the DSP 50 receives a second shutter-release button (not shown) that is input according to the user's manipulation in Operation 919 and captures an image in Operation 921. The DSP 50 enlarges an eye portion of the image that is captured by focusing on the subject based on the eye automatically and displays the eye portion during image reproduction so that a user may check whether the subject is properly focused on. Also, when the subject is not properly focused on and the eye image is unclear, the DSP 50 may correct the image to be clear.

Figure 10A:
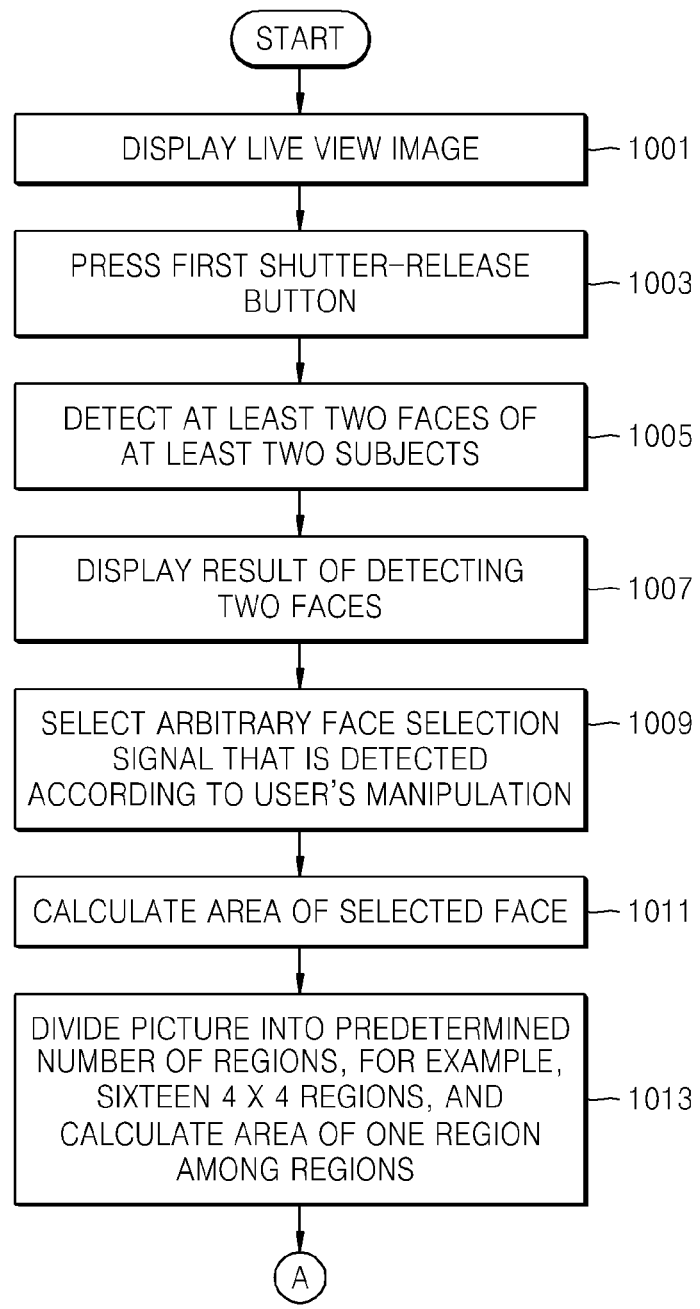
FIGS. 10A and 10B are flowcharts illustrating a method of focusing on a subject in the digital image processing device of FIG. 1, according to another embodiment of the invention.
Figure 10B:
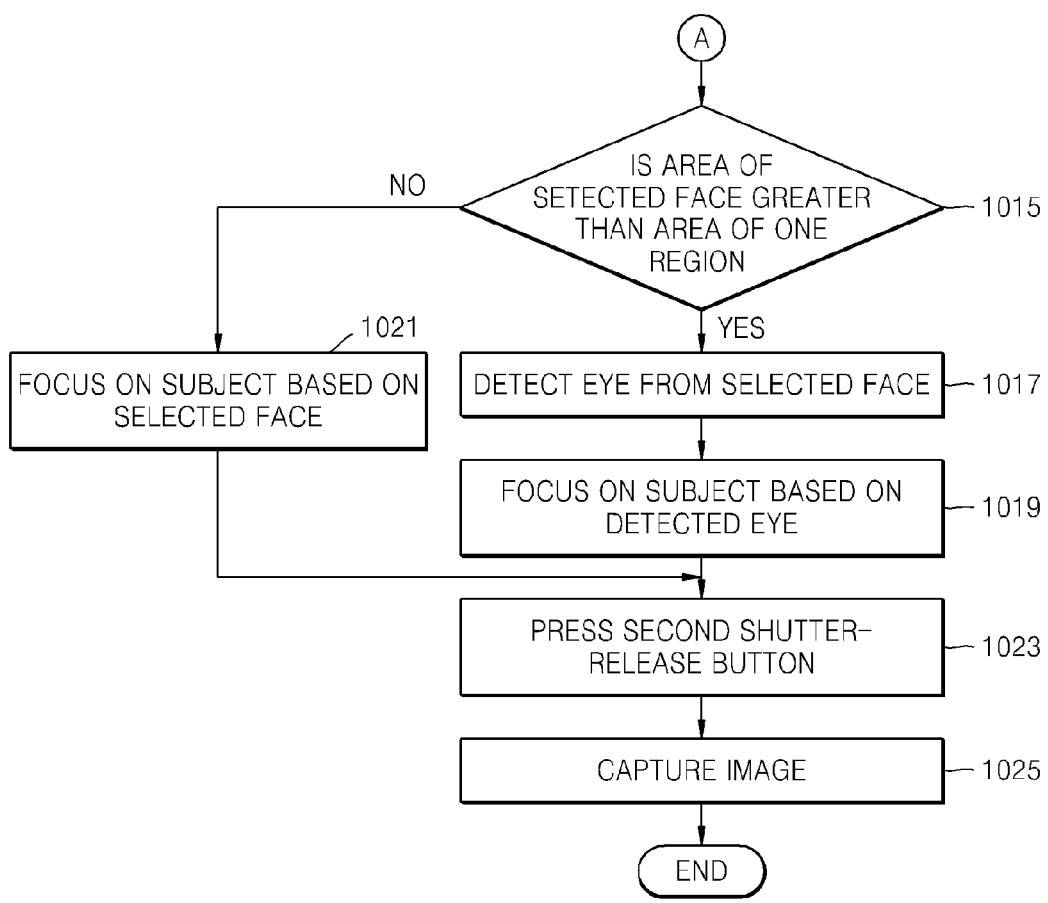

Another method of focusing on a subject in a digital image processing device, according to another embodiment of the invention, will be described with reference to FIGS. 10A-B. FIGS. 10A-B contain a flowchart illustrating a method of focusing on a subject in the digital image processing device of FIG. 1, according to another embodiment of the invention. Unlike in FIG. 9, according to the present embodiment, the DSP 50 receives a face selection signal that is detected according to the user's manipulation and focuses on the subject according to the selected face.

Referring to FIGS. 10A-B, if a live view image is displayed on the display unit 80, i.e., in a picture, in Operation 1001, the DSP 50 receives a first shutter-release button (not shown) signal that is input according to the user's manipulation in Operation 1003.

The DSP 50 that receives the input first shutter-release button signal detects at least two faces of at least two subjects of the live view image in Operation 1005 and displays a result of detecting the two faces on the display unit 80 in Operation 1007. FIG. 6A illustrates the result of detecting the two faces of the two subjects, and first and second face regions 601 and 602.

If the faces are detected from the subject, the DSP 50 receives an arbitrary face region selection signal that is detected according to the user's manipulation in Operation 1009.

Subsequently, the DSP 50 calculates an area of the selected face in Operation 1011, and then divides the entire picture into a predetermined number of regions and calculates an area of the region 603 among the divided regions in Operation 1013. As an example thereof, the DSP 50 may divide the picture into nine (3×3) regions or sixteen (4×4) regions. FIG. 6B or 6C illustrates an example in which the picture is divided into sixteen (4×4) regions.

The DSP 50 determines whether an area of the selected face is greater than the area of the region 603 in Operation 1015. For example, the DSP 50 determines whether the area of the selected first face detection region 601 is greater than the area of the region 603, as illustrated in FIG. 6B, or the DSP 50 determines whether the area of the selected second face detection region 602 is greater than the area of the region 603.

If it is determined that the area of the selected face region is greater than the area of the region 603, the DSP 50 detects an eye from the detected face in Operation 1017. For example, if it is determined that the area of the selected first face region 601 is greater than the area of the region 603, as illustrated in FIG. 6B, the DSP 50 detects the eye from the first face region 601, and if it is determined that the area of the selected second face region 602 is greater than the area of the region 603, as illustrated in FIG. 6C, the DSP 50 detects the eye from the second face region 602.

If the eye is detected, the DSP 50 focuses on the subject based on the detected eye. For example, the DSP 50 focuses on the subject based on the eye detected from the selected first face region 601, as illustrated in FIG. 6B, or the DSP 50 focuses on the subject based on the eye detected from the selected second face region 602, as illustrated in FIG. 6C.

In this way, it is determined that the ratio of the detected face in the picture is greater than a predetermined ratio. Thus, when a range where the detected face is recognized from the picture is large due to close-up photographing, the eyes of a subject are focused on, and the subject may be captured more vividly. Also, when the range where the face is recognized from the picture is large due to close-up photographing, cosine errors that may occur in photographing may be reduced.

Otherwise, if the area of the selected first face region 601 or second face region 602 is smaller than the area of the region 603, the DSP 50 focuses on the subject based on the detected face in Operation 1021.

After the subject is focused on the detected eye or the detected face, the DSP 50 receives a second shutter-release button (not shown) that is input according to the user's manipulation in Operation 1023 and captures an image in Operation 1025. The DSP 50 enlarges an eye portion of the image that is captured by focusing on the subject based on the eye automatically and displays the eye portion during image reproduction so that a user may check whether the subject is properly focused on. Also, when the subject is not properly focused on and the eye image is unclear, the DSP 50 may correct the image to be clear.

Next, a method of focusing on a subject in a digital image processing device, according to another embodiment of the invention, will be described with reference to FIG. 11. FIG. 11 is a flowchart illustrating a method of focusing on a subject in the digital image processing device of FIG. 1, according to another embodiment of the invention. Unlike in FIG. 10, according to the present embodiment, the DSP 50 performs on the detected faces bracketing photographing by which several images are simultaneously captured by pressing a photographing button only once.

If the digital image processing device is set in a bracketing photographing mode in Operation 1101 and a live view image is displayed on the display unit 80, i.e., in a picture, in Operation 1103, the DSP 50 receives a first shutter-release button (not shown) signal that is input according to the user's manipulation in Operation 1105.

The DSP 50 that receives the input first shutter-release button signal detects faces of at least two subjects of the live view image in Operation 1107 and displays a result of detecting the faces on the display unit 80 in Operation 1109. FIG. 8A illustrates a result of detecting four faces of four subjects, and first through fourth face regions 801, 802, 803, and 804.

Subsequently, the DSP 50 calculates areas of the detected faces in Operation 1111.

Subsequently, the DSP 50 divides the entire picture into a predetermined number of regions and calculates an area of a region 805 among the divided regions in Operation 1113. As an example thereof, the DSP 50 may divide the picture into nine (3×3) regions or sixteen (4×4) regions. FIG. 8B illustrates an example in which the picture is divided into sixteen (4×4) regions.

After calculating the areas of the detected faces, the DSP 50 receives a second shutter-release button signal that is input according to the user's manipulation in Operation 1115 and performs bracketing photographing in Operation 1117.

In detail, in Operation 1117, when performing bracketing photographing, as illustrated FIGS. 8B (b-1) through (b-4), the DSP 50 compares an area of each of the first through fourth face regions 801, 802, 803, and 804 with an area of a region 805 that is obtained by dividing the entire picture into a predetermined number of regions. If the area of the first face region 801 is smaller than the area of the region 805, as illustrated in FIG. 8B (b-1), the DSP 50 allows the subject to be focused on based on the detected first face region 801. Also, if the area of the second face region 802 is greater than the area of the region 805, as illustrated in FIG. 8B (b-2), the DSP 50 allows the subject to be focused on based on the eye detected from the second face region 802. Also, if the area of the third face region 803 is smaller than the area of the region 805, as illustrated in FIG. 8B (b-3), the DSP 50 allows the subject to be focused on based on the detected third face region 803. Also, if the area of the fourth face region 804 is greater than the area of the region 805, as illustrated in FIG. 8B (b-4), the DSP 50 allows the subject to be focused on based on the eye detected from the fourth face region 804.

In this way, an image that is focused on based on the first and third face regions 801 and 803 detected by bracketing photographing, and an image that is focused on based on the eyes of the second and fourth face regions 802 and 804 detected by bracketing photographing may be captured by pressing the photographing button only once.

In this way, it is determined that the ratio of the detected face in the picture is greater than a predetermined ratio. Thus, when a range where the detected face is recognized from the picture is large due to close-up photographing, the eyes of a subject are focused on, and the subject may be captured more vividly. Also, when the range where the face is recognized from the picture is large due to close-up photographing, cosine errors that may occur in photographing may be reduced.

The DSP 50 enlarges an eye portion of the image that is captured by focusing on the subject based on the eye automatically and displays the eye portion during image reproduction so that a user may check whether the subject is properly focused on. Also, when the subject is not properly focused on and the eye image is unclear, the DSP 50 may correct the image to be clear.

As described above, in the method and apparatus for focusing on the subject in the digital image processing device, photographing is performed by focusing on the subject based on the eyes detected from faces having a greater ratio than a predetermined ratio in a picture so that a portrait image can be conveniently captured and a clear portrait image can be obtained.

The algorithms described above may be implemented using software modules that may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. An apparatus for focusing on a subject, comprising:
    a manipulation unit configured to receive a request for a focus adjustment on a subject; and
    a digital signal processor configured to:
        detect a face of the subject and an eye of the subject;
        compare a whole area of the detected face with a predetermined reference value; and
        when the area of the detected face is smaller than the predetermined reference value, perform the focus adjustment based on the whole area of the detected face, and when the area of the detected face is greater than the predetermined reference value, perform the focus adjustment based on an area of the detected eye.

2. The apparatus for focusing on a subject of claim 1, wherein the predetermined reference value is an area of a predetermined region of a screen.

3. The apparatus for focusing on a subject of claim 1, wherein if at least two faces are detected, the digital signal processor performs the focus adjustment on the basis of an area of a face selected by the user from among the at least two faces.

4. The apparatus for focusing on a subject of claim 1, wherein in a bracketing photographing mode, if at least two faces are detected, the digital signal processor performs the focus adjustment on each of the detected faces.

5. A method of focusing on a subject, the method comprising:
    receiving a request for a focus adjustment on a subject;
    detecting a face of the subject and an eye of the subject;
    comparing a whole area of the detected face with a predetermined reference value; and
    if the area of the detected face is smaller than the predetermined reference value, performing the focus adjustment based on the whole area of the detected face, and if the area of the detected face is greater than the predetermined reference value, performing the focus adjustment based on an area of the detected eye.

6. The method of focusing on a subject of claim 5, wherein the predetermined reference value is an area of a predetermined region of a screen.

7. The method of focusing on a subject of claim 5, wherein in the performing of the focus adjustment, if at least two faces are detected, the focus adjustment is performed on the basis of an area of a face selected by the user from among the at least two faces.

8. The method of focusing on a subject of claim 5, wherein in the performing of the focus adjustment, in a bracketing photographing mode, if at least two faces are detected, the focus adjustment is performed on each of the detected faces.

9. A computer readable recording medium having embodied thereon a program for executing the method of claim 5.

* * * * *